US009040860B2

(12) United States Patent
De Leo et al.

(10) Patent No.: US 9,040,860 B2
(45) Date of Patent: May 26, 2015

(54) MACHINE FOR SORTING FLATS

(75) Inventors: Guido Teodoro De Leo, Genoa (IT); Cristiano Franzone, Genoa (IT)

(73) Assignee: ELSAG DATAMAT SPA, Genoa (IT)

( * ) Notice: Subject to any disclaimer, the term of this patent is extended or adjusted under 35 U.S.C. 154(b) by 805 days.

(21) Appl. No.: 12/683,417

(22) Filed: Jan. 6, 2010

(65) Prior Publication Data

US 2010/0185318 A1 Jul. 22, 2010

(30) Foreign Application Priority Data

Jan. 7, 2009 (IT) .............................. TO2009A0002

(51) Int. Cl.
*G06K 9/00* (2006.01)
*B07C 3/06* (2006.01)

(52) U.S. Cl.
CPC ..................................... *B07C 3/065* (2013.01)

(58) Field of Classification Search
USPC .................. 209/583, 584, 900; 700/223–227; 271/3.12, 149, 275, 301–303, 305
See application file for complete search history.

(56) References Cited

U.S. PATENT DOCUMENTS

| | | | | |
|---|---|---|---|---|
| 4,388,994 | A | 6/1983 | Suda et al. | |
| 5,143,225 | A * | 9/1992 | Rabindran et al. | 209/584 |
| 5,158,183 | A * | 10/1992 | Beerman et al. | 209/546 |
| 5,433,325 | A * | 7/1995 | Levaro et al. | 209/584 |
| 5,810,174 | A * | 9/1998 | Hamada et al. | 209/584 |
| 5,981,891 | A * | 11/1999 | Yamashita et al. | 209/584 |
| 7,665,720 | B2 * | 2/2010 | Mori et al. | 270/52.16 |
| 7,737,378 | B2 * | 6/2010 | Zimmermann | 209/584 |

* cited by examiner

*Primary Examiner* — Joseph C Rodriguez
*Assistant Examiner* — Kalyanavenkateshware Kumar
(74) *Attorney, Agent, or Firm* — FSP LLC

(57) ABSTRACT

A sorting machine at least for flat postal items comprises a stacking module having a plurality of stacking stations, which define respective channels along which the postal products are carried and a first plurality of rollers for handling the postal products along the stacking stations, a first carrying assembly defining a second channel configured for carrying the postal products towards the stacking module and comprising a second plurality of rollers for carrying the postal products, a plurality of deviating assemblies, each of which comprises a first device selectively mobile for deviating a flat into the channel of the desired stacking station, and a second carrying assembly delimiting an outlet channel communicating with the plurality of stacking stations, wherein at least one of the first and second rollers is mobile transversely with respect to the direction of conveyance of the postal products on the machine.

29 Claims, 11 Drawing Sheets

MACHINE FOR SORTING FLATS

The present invention relates to a machine for sorting and preferably sequencing at least flat postal items.

BACKGROUND OF THE INVENTION

From the moment in which the postal products are sent, they are divided according to the destination via automatic systems that comprise plants located throughout the territory. In particular, the automatic system may envisage a sorting stage executed in a number of steps, in which the postal items are divided, on one and the same distribution level, according to the destinations. Once ordered according to destination, the postal products are delivered by postmen, who follow predetermined routes. The automatic system may moreover envisage a sequencing stage, in which the postal products are ordered according to the predefined succession of the civic numbers along the route of the postman. In this way, when the postman follows the route with his own vehicle, the postal products are sequenced, i.e., ordered according to the civic number, in the box, and the operation of delivery performed by the postman is simplified. By way of example, the sorting stage comprises a number of steps performed individually or else in groups by automatic machinery. A first step may consist in sorting the postal products to be delivered over the regional territory, a second step may consist in sorting the postal products to be delivered over the territory of a province, and an n-th step may consist in sorting the postal products according to the different routes, one or more of which is covered by a postman.

The sequencing stage is subsequent to the step of sorting according to the postman's route and is executed by complicated and for this reason very costly machines.

The sequencing stage can be executed by a sorting machine that, appropriately programmed, performs the sequencing function.

SUMMARY OF THE INVENTION

The aim of the present invention is to provide a sorting machine that will be free from the drawback specified above.

BRIEF DESCRIPTION OF THE DRAWINGS

For a better understanding of the present invention, the latter will be further described in non-limiting embodiments with reference to the attached figures; in particular.

DETAILED DESCRIPTION OF THE INVENTION

Figure 1:
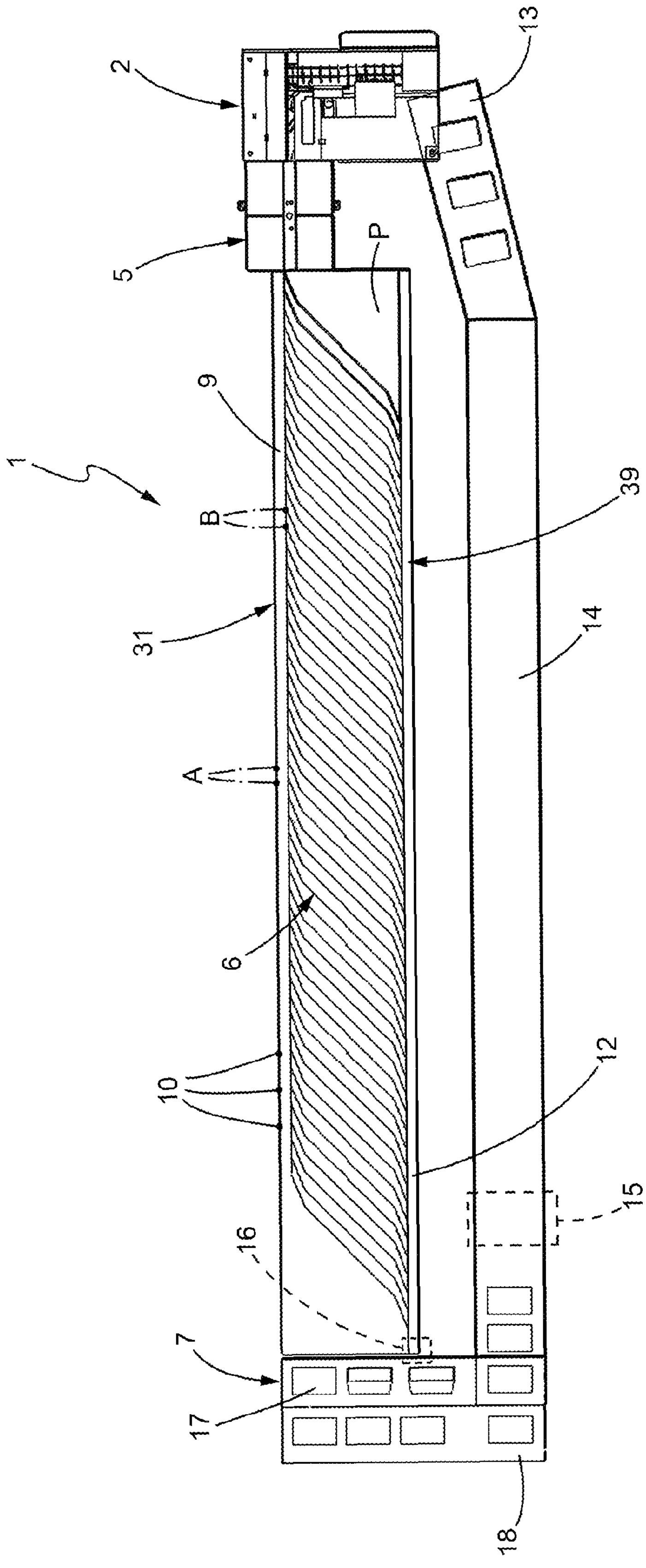
FIG. 1 is a top plan view of a sorting machine according to the present invention.

Designated as a whole by one in FIG. 1 is a sorting machine for ordering flat postal products, referred to hereinafter for brevity as "flats". The sorting machine comprises from upstream to downstream, a sequencing module 2 for flats, a data-acquisition module 5 for detecting automatically the address on the flat, a shingling stacking module 6 for ordering the postal products in a predetermined and programmable sequence, and a loading module 7 for loading in purposely provided boxes 8 lots of sequenced flats ready for delivery along the route of the postman.

The sequencing module 2 receives at input flats pre-sorted at one and the same distribution level, i.e., obtained at the end of one and the same sorting step. For example, the flats are directly delivered in this way by big senders, or by sorting machines that are located upstream in the process.

The flats arriving from the preceding sorting stage are loaded by an operator onto the sequencer 2, which performs the function of separating and setting the flats at a distance from one another one by one according to a temporal and spatial gap that is on average constant.

The data-acquisition module 5 performs the function of acquiring and possibly decoding the information appearing on the flat for sequencing it according to the route of the postman. Said information comprises, for example, an extended postal code capable of identifying the delivery point uniquely. The acquisition of the information can be executed according to various modalities, for example via optical acquisition of the label with the address or else via detection of a barcode appearing on the postal product.

The stacking module 6 has a substantially horizontal arrangement and comprises a fixed support plane P on which the flats slide by friction in an upright position, a carrier 9 for the sequenced flats coming from the data-acquisition module 5, and a plurality of deviators 10 for sorting the flats in respective stacking stations 11. The stacking module faces a carrier 12, which receives the flats from the individual stacking stations 11 to form a single shingled group of items directed towards the loading module 7. In the description and in the ensuing claims the expression "upright position" indicates the position in which the flat rests in a substantially vertical position on any of its edges and not on the faces.

According to the present invention, the carriers 9, 12 are of one and the same type and preferably comprise handling belts that are mobile with respect to the fixed plane P, as will be specified in what follows. In addition, the carriers 9, 12 handle the flats in directions parallel to one another and are set at a distance from one another transversely to delimit the stacking stations 11 longitudinally.

The deviators 10 of the stacking stations 11 are only schematically illustrated in FIG. 1, and each of them comprises mobile parts configurable in an extracted position, in which the sequenced flat is intercepted and deviated in a purposely provided stacking station 11, and a retracted position, in which the flat can proceed without being deviated into a subsequent stacking station 11.

Each stacking station 11 corresponds to a stop along the route of the postman. For example, each stop regards a civic number. Consequently, the flats accumulated in one and the same stacking station 11 are delivered by the postman in the same stop of his own delivery route.

The loading module 7 has a carrying line having an initial station 13, which is provided with empty parallelepipedal boxes 8, a rectilinear conveyor belt 14 set alongside the stacking module 6, an upstream overturning station 15, in which the boxes 8 on the conveyor belt 14 are automatically laid one by one on a long side thereof, a loading station 16, in which each box 8 receives the sequenced flats arriving from the carrier 12, a downstream overturning station 17, in which the loaded box 8 is brought into the usual position, and a terminal station 18, in which the boxes 8 can be picked up ready for the delivery rounds of the postman along the route corresponding to the sequenced flats.

In particular, the initial station 13 is adjacent to the sequencer 2 and receives the box 8 that the operator has emptied for loading the sequencer 2.

In the loading station 16, the box 8 advances continuously at a predetermined speed referred to the speed of advance of the carrier 12 so as to be filled progressively by the shingled group of items handled continuously by the carrier 12.

Figure 7:
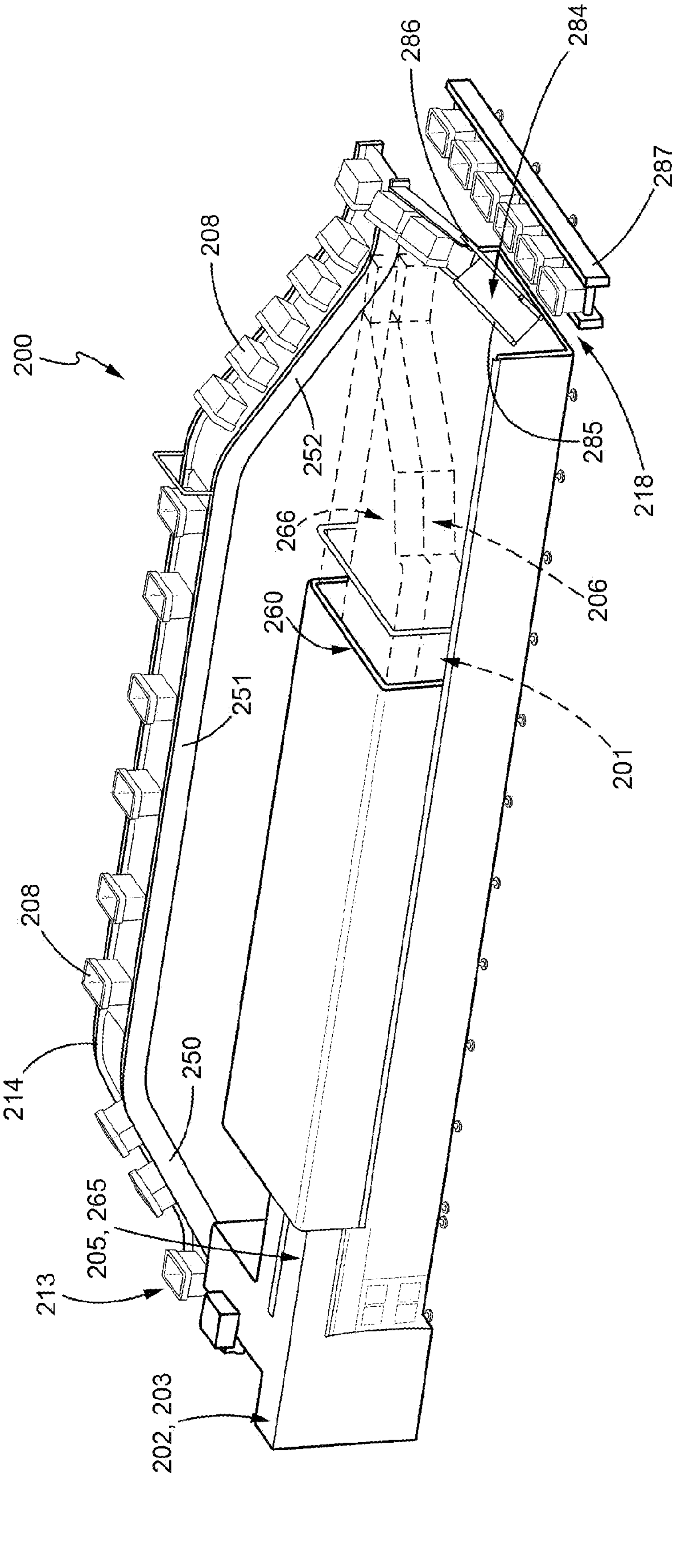
FIG. 7 is a perspective view of a third embodiment of the present invention.

Preferably, the conveyor belt 13 supports the boxes 8 (as illustrated in FIG. 7). In addition, tipping-over is obtained by impact against a purposely provided fixed projection set at such a height with respect to that of the underlying portion of the conveyor belt 14 that the box 8 is laid on one side and, once laid down, can pass beyond the fixed projection. The box 8 is finally set upright before reaching the terminal station 18 via a fixed surface having an angle of inclination with respect to the vertical smaller than that of the surface that supports the box 8 in the loading station 16 and that, possibly, decreases progressively in the direction of advance of the box 8, as illustrated in FIG. 7.

In order to enable reliable processing of flats in an upright position, each deviator 10 comprises (FIG. 2) a device 21 set in the proximity of the area of intersection between a median plane of each stacking station 11 and the carrier 9. To enable the flats to be carried from the carrier 9 to the carrier 12, each stacking station 11 comprises a plurality of belts 22, which face one another in pairs and define directions of advance transverse with respect to the direction of advance of the flats on the carriers 9, 12.

The device 21 comprises an arm 25, which can turn about an axis A coming out in a perpendicular direction of the fixed plane P and a damping element 26 connected to the arm 25. The damping element 26 preferably comprises a pair of rollers 27, 28 carried by the arm 25 and set at a distance from one another, and an elastic belt 29 tensioned between the rollers 27, 28. Preferably, the roller 27 shares the axis A and is connected to a source of motion for driving also the roller 28 via the belt 29.

Consequently, the deviators 10 define in an integrated way both the deviator member and the member for handling the flats on the fixed plane P, i.e., the carrier 9. The carrier 9 is configured in such a way that the flats slide on the fixed plane P on their own edges in an upright position and are driven by lateral forces applied by the belts 29 on their own faces.

According to a preferred embodiment of the present invention, the belts 22 of the stacking stations 11 delimit laterally a plurality of channels 23, in which the flats that rest on the fixed plane P accumulate in a shingled manner subdivided according to the stop along the delivery route. Each belt 22 is continuous and is wound around a respective pair of rollers 30 to define a conveying branch co-operating with one face of the flats, and a return branch set on an opposite side of the flats with respect to the conveying branch. Preferably, the conveying and return branches are free (i.e., no guide runners are present) and consequently follow a rectilinear path. Furthermore, the rollers 30 are able to turn about respective axes B parallel to the axes A and are set so as to define segments transverse with respect to the direction of advance of the carriers 9, 12. Advantageously, the segments are set so as to define a succession of acute angles 'α' for deviating the flats from the direction of handling along the carrier 9. Advantageously, the sum of the acute angles 'α' that defines the deflection between the carrier 9 and the stacking stations is comprised between 30° and 70°, for example approximately 45°. The angle that defines the deflection between a stacking station 11 and the carrier 12 has a similar value.

In addition, the axes B of the rollers 30 proximal to the deviators 10 lie in a first plane perpendicular to the fixed plane P, and the axes A of the deviators 10 lie in a second plane parallel to and set at a distance from the first plane. In this way, the axes A and B delimit a rectilinear channel 31 of the carrier 9 along which the flats slide by friction on the fixed plane P driven by the belts 29 on one face and by the rollers 30 proximal to the belts 29 on the other face.

When the flats are deviated into the stacking stations 11, in order to keep the flats in contact against the belts 22, set within each channel 23 is a plurality of pressure rollers 37 mounted on respective arms 38 pivoting around fixed pins perpendicular to the fixed plane P. Preferably, the pressure rollers 37 exert an elastic action on the face of the flats opposite to the face contacting the conveying branch of the belts 22, and the diameter is such as to contact, at least in certain conditions of operation, the return branch of the belt 22 of the adjacent channel 23 so as to contribute to conveying of the flats. With reference to one channel 23, the conveying branch faces the loading station 16, whilst the pressure rollers 37 are mounted towards the data-acquisition module 5; i.e., the conveying branch is set downstream, and the pressure rollers 37 are set upstream. Furthermore, according to a preferred embodiment of the present invention, the rollers 30 proximal to the carrier 12 are mounted on elastic supports so as to recede when the flats pass from the stacking stations 11 to the outlet channel 39.

Figure 3:
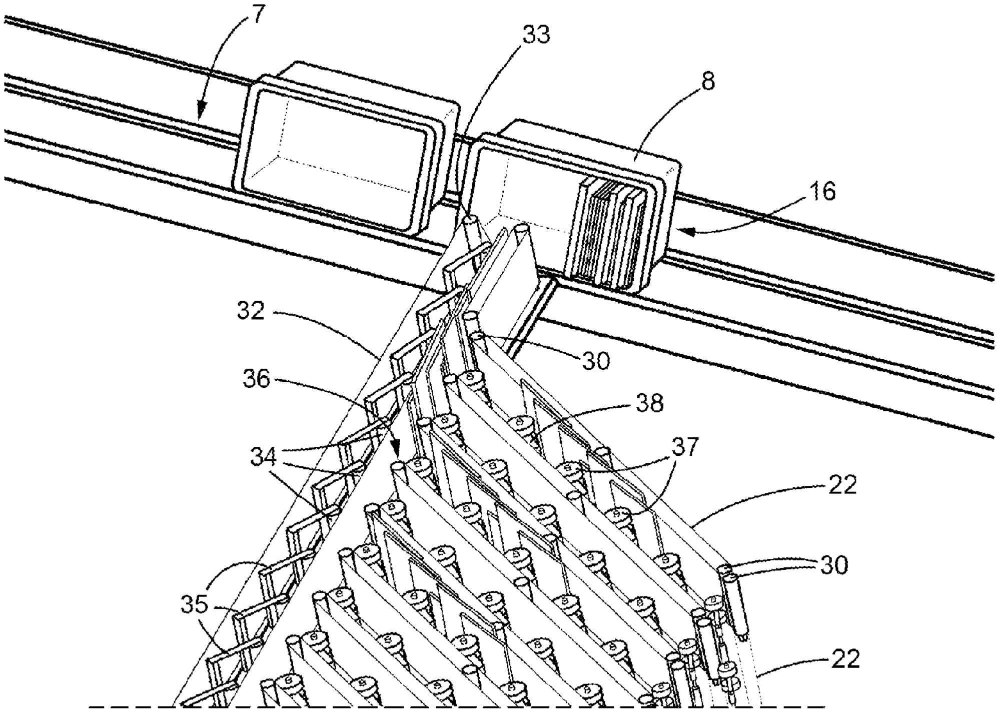
FIG. 3 is a perspective view of a second portion of the machine of FIG. 1.

In relation to the carrier 12, FIG. 3 illustrates the outlet of the channels 23. Like the carrier 9, the carrier 12 brings the flats into an upright position and comprises a belt 32, which extends preferably from the first stacking station 11 to the last and is wound around rollers 33 (only one of which is illustrated). In addition, the carrier 12 comprises a plurality of idle rollers 34 mounted on respective rocking supports 35. Advantageously, the rocking supports 35 are actuated elastically to enable the belt 32 to perform a movement in a direction perpendicular to that of advance, indicated by the arrow in FIG. 3. In particular, the rocking supports 35 push the belt 32 towards the channels 23 in such a way that the belt 32 runs substantially in a third plane. Furthermore, the rollers 30 proximal to the belt 32 have the respective axes lying in a fourth plane parallel to the third plane. The third and fourth planes are set at a distance apart to define an outlet channel 39, into which all the stacking stations 11 give out.

Figure 4A:
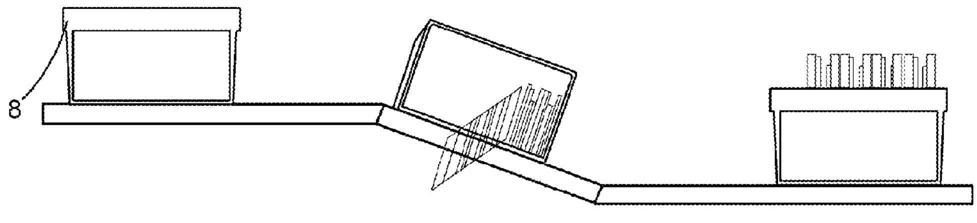
FIGS. 4*a* and 4*b* are respective front and side views of a box during a step of loading of the postal products.
Figure 4B:
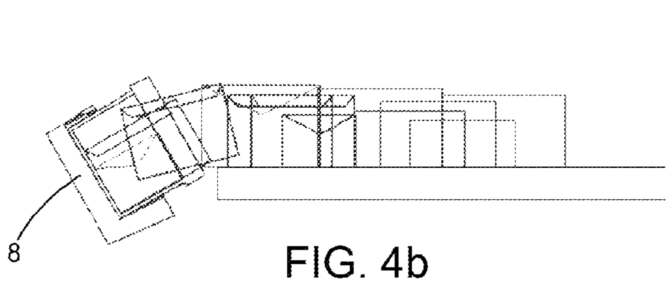

Illustrated in FIG. 4 is the mode of filling of the box 8. The flats that are ordered in the respective stacking stations 11 gain access simultaneously to the outlet channel 39 to keep their own order. They are gathered to form a shingled group of items and are handled by the belt 32 on one face and by the rollers 30 proximal to the belt 32 on the other face. The relationship between the speed of advance of the flats in the outlet channel 39 and of the box 8 in the loading station 16 is such that the flats assume by gravity an upright position and are set side by side so as to be all simultaneously accessible to the postman. As illustrated in FIG. 4, the box 8 is conveniently inclined both with respect to the vertical to receive better the flats coming from the channel 39 and longitudinally downwards with respect to the direction of advance to improve further insertion of the flats in the box 8.

The rollers 27, 30, 33 are advantageously motorised by cogged belts for keeping the speeds of rotation synchronized. In particular, in order to be able to govern an independent handling of the carriers 9, 12 and of the stacking module 6, the rollers 27, 30, 33 of each group are connected via a corresponding single belt, and each group of rollers is handled via a corresponding motor.

According to what has been described previously, the machine 1 is configured for carrying the flats so as to enable shingling both in the stacking stations 11 and on the carrier 12, where a single sequenced shingled group of items is formed that will be loaded into the boxes 8.

FIG. 3 illustrates a further embodiment, in which a sorting machine 100 is adapted with respect to the machine 1 to enable processing both of a first postal product other than flats, for example letters, and flats. The modules and the elements that are structurally the same between the machines 1, 100 are associated in what follows to reference numbers that are the same as the ones used previously, but preceded by the number '1'. Said modules and elements are the same as the ones previously described, except where otherwise specified and are described briefly in what follows.

The sorting machine 100 comprises, proceeding from upstream to downstream, a sequencing module 102 for letters, a sequencing module 103 for flats, a convergence module 104 for managing the convergence of the letters and of the flats into a single channel 131, a data-acquisition module 105 for detecting automatically the address on the postal product, a stacking module 6 for ordering the postal products in a predetermined and programmable sequence, and a loading module 107 for loading the sequenced postal products in purposely provided boxes 108.

The sequencing modules 102, 103 receive at input flats and letters pre-sorted at one and the same distribution level, i.e., obtained at the end of one and the same sorting step.

The postal products are loaded by an operator onto the respective sequencers 102, 103, which perform the function of sequencing the postal products one by one according to a temporal and spatial gap that is on average constant.

The convergence module 104 receives at input the letters from the sequencer 102 and the flats from the sequencer 103. The letters and the flats are processed so as to converge into a single outlet sequence according to a modality that will be better specified in what follows.

The data-acquisition module 105 performs the function of acquiring and possibly decoding the information appearing on the postal products for sequencing according to the route.

The stacking module 106 presents all the characteristics of the stacking module 6 described previously and is only briefly illustrated in what follows.

In particular, the stacking module 106 comprises a carrier 109 for the sequenced postal products coming from the data-acquisition module 105, and a plurality of deviators 110 for sorting the postal products in respective stacking stations 111. The stacking module 106 faces a carrier 112, which receives the postal products from the individual stacking stations 11 to form a single shingled group of items directed towards a loading station 116. Advantageously, the carriers 109, 112 are of one and the same type and preferably comprise handling belts that are mobile with respect to the fixed plane P, as has been described for the machine 1.

Figure 5:
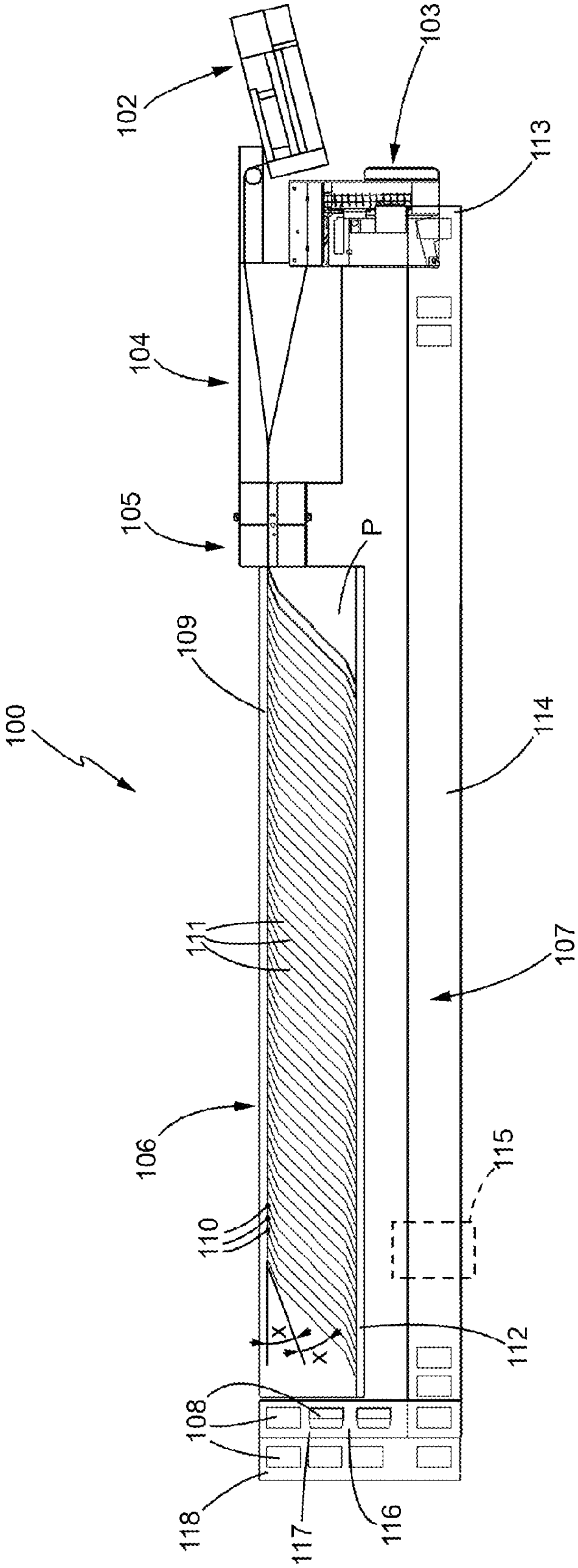
FIG. 5 is a top plan view of a second embodiment of the present invention.

The deviators 110 are only schematically illustrated in FIG. 5 and each of them comprises mobile parts configurable in an extracted position, in which the postal product is intercepted and deviated into a purposely provided stacking station 111, and a retracted position, in which a postal product can proceed without being deviated into a subsequent stacking station 111.

The loading module 107 is structurally identical to the loading module 7 and has a carrying line having an initial station 113, which is provided with empty parallelepipedal boxes 108, a rectilinear conveyor belt 114 set alongside the stacking module 106, an upstream overturning station 115, in which the boxes 108 on the conveyor belt 114 are automatically laid one by one on a long side thereof, a loading station 116, in which each box 108 receives the postal products already sequenced and collected, letters with flats, arriving from the carrier 112, a downstream overturning station 117, in which the loaded box 108 is brought into the usual position, and a terminal station 118, in which the boxes 108 can be picked up ready for the rounds of the postman.

In particular, the initial station 113 is adjacent to at least one of the sequencers 102, 103 and receives the box 108 that the operator has emptied for loading the sequencers 102, 103.

In the loading station 116, the box 108 advances continuously at a predetermined speed and is filled progressively by the shingled group of items handled continuously by the carrier 112.

Unlike the machine 1, the machine 100 is built in such a way as to process alternately a lot made up of letters at a first constant processing speed and a lot made up of flats at a second constant speed slower than the first speed.

In particular, the sequencer 102 processes the flats always at the first speed and the sequencer 103 processes the letters always at the second speed. Each module set downstream of the sequencers 102, 103 is built in such a way as to be able to process the postal products both at the first speed and at the second speed.

In particular, the convergence module 104 and the data-acquisition module 105 are built to be able to carry the postal products and perform their own function both at the first speed and at the second speed of feed.

Also the carriers 109, 112 of the stacking module 106 can be set to function both at the first speed and at the second speed to adapt to the different average masses of the flats with respect to the letters.

Constructively, the carriers 9, 12 and the carriers 109, 112 are identical to one another.

Figure 6:
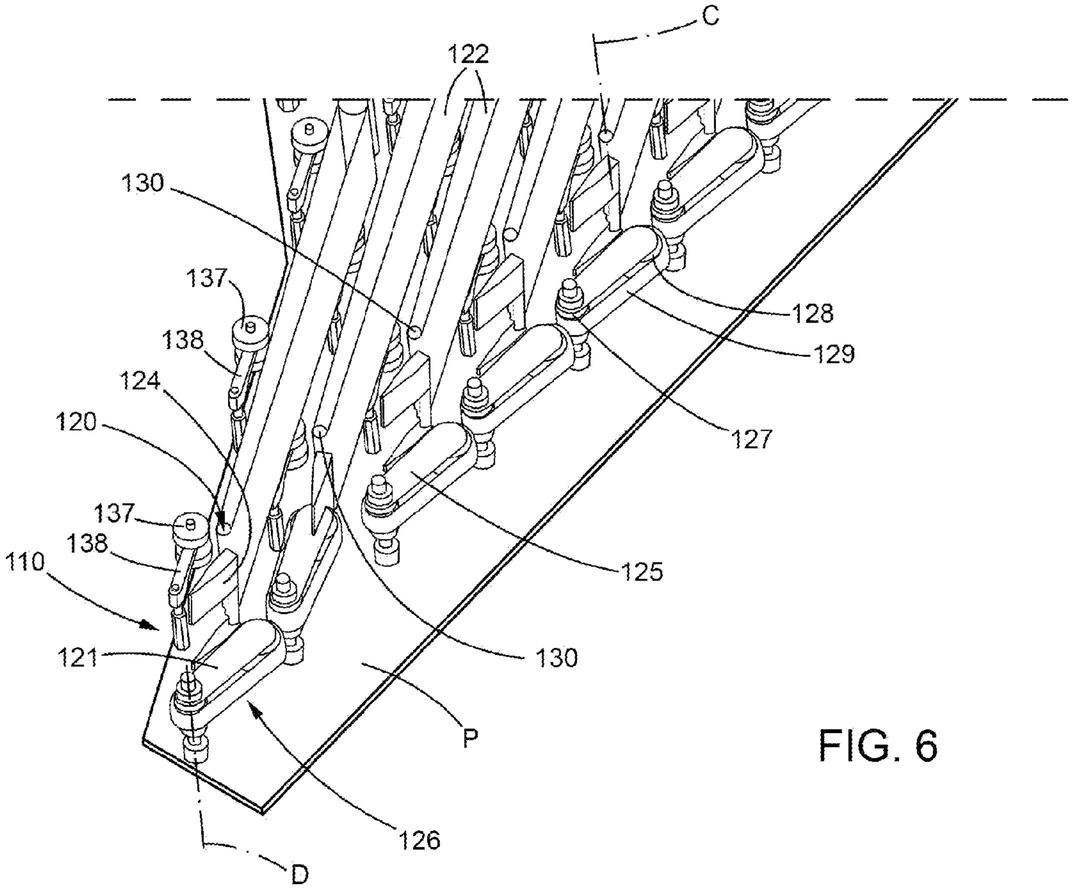
FIG. 6 is a perspective view of a detail of the machine of FIG. 5.

In order to enable processing in a reliable way of both flats and letters and unlike the machine 1, each deviator 110 comprises (FIG. 6) a first device 120 and a second device 121, each of which is specifically configured for deviating either letters or flats of a given type in the desired stacking station 111. The devices 120, 121 are set respectively in the proximity of each stacking station 110, which is delimited by parallel belts 122, transverse to the direction of advance of the postal products along the carriers 109, 112. The device 120 has a mass lower than the device 121 so as to reduce its own response times.

For example, the first device 120 comprises one or more fins 124 and is used for deviating letters or postcards. The fins 124 turn between the extracted position and the retracted position about an axis C set in the proximity of the containment belt 122 downstream of each stacking station 110. Preferably, the fins 124 are coplanar.

The second device 121 is the same as the device 21 and comprises an arm 125 that can turn about an axis D set at a distance from the axis C and a damping element 126 connected to the arm 125. The damping element 126 preferably comprises a pair of rollers 127, 128 carried by the arm 125 and set at a distance from one another, and an elastic belt 129 tensioned between the rollers 127, 128. Preferably, the roller 127 shares the axis A and is connected to a source of motion for driving also the roller 128 via the belt 129. The belts 129 contact one face of the postal products and apply thereon an action such as to cause advance on the fixed plane P. Consequently, the devices 121 define in an integrated way both the member for deviating and the member for handling the postal products on the fixed plane P, i.e., the carrier 109.

The axes C and D lie in respective parallel planes that are set at a distance to define a channel 131 along which the postal products travel along a rectilinear path when the fins 124 and the arms 125 are in the retracted position.

As described previously, each belt 122 is continuous and is wound around a respective pair of rollers 130 to define a conveying branch co-operating with one face of the postal products and a return branch set on the opposite side of the postal products with respect to the conveying branch.

In addition, to keep the postal products in contact against the belts 122, set within each channel 123 is a plurality of pressure rollers 137 mounted on respective arms 138 that pivot around fixed pins and act elastically on the faces of the postal products.

The machine 100 is configured for processing, in addition to flats, also letters, i.e., two different postal products, and the sequencing stage is obtained in such a way that both the flat/s and the letter/s possibly addressed to a single civic number are shingled in a single channel 123.

The operator receives containers 108 loaded with postal products not yet sequenced and manually loads said products into the respective sequencers 102, 103.

The sequencers 102, 103 are controlled in a co-ordinated way so as to sequence at the respective speed of feed but to stop while the other sequencer is active. The sequencers 102, 103 consequently perform also the function of controlling the flow of the lots of postal products towards the modules of the machine 100 that are set downstream.

Via a purposely provided control unit, the sequencers 102, 103 are actuated alternately for processing in series lots of flats and letters alternately. When the machine 1 sequences a lot made up of letters, the control unit sets the first speed for the carrier 109, and also the data-acquisition module 105 is switched for processing the letters at the first speed.

Likewise, the control unit governs the passage to the second speed of feed of the carriers and of the data-acquisition module 105 when a lot made up of flats is processed.

The machine 100 orders the different lots of postal products in the correct stacking station 111. After processing all the lots, the stacking stations 111 unload simultaneously, or in such a way as to keep the sequence, the respective set of postal products onto the carrier 112 so as to form a continuous and ordered shingled group of items. In the machine 100, the postal products are loaded into the boxes 108 according to the same principle already described and illustrated in FIG. 4. However, the speed of advance of the carrier 112 is different from that of the belt 12 since it is necessary to take into account the fact that the machine 100 processes both flats and letters which have respective different average dimensions.

According to the embodiment of the present invention illustrated in FIG. 7, it is possible to produce a machine 200 having a first circuit for sequencing postal items of the first type, i.e., letters, a second circuit set parallel to the first circuit for sequencing postal items of the second type, i.e., flats, and a system for collecting the letters and the flats so as to create a single shingled group of items.

The sorting machine 200 is adapted with respect to the machine 1 to be able to process both flats and letters as the machine 100. The modules and the elements that are structurally the same between the machines 1, 200 are in what follows associated to reference numbers that are the same as the ones used previously, but preceded by the number '2'. Said modules and elements are the same as the ones previously described, except where otherwise specified.

According to a preferred embodiment, the machine 200 comprises a processing unit for flats 201, which has on a first level proceeding from upstream to downstream: a sequencing module 202 for flats; a data-acquisition module 205 for automatic detection of the address on the flats; and a module for stacking by shingling 206 so as to order the flats in a predetermined and programmable sequence.

Figure 2:
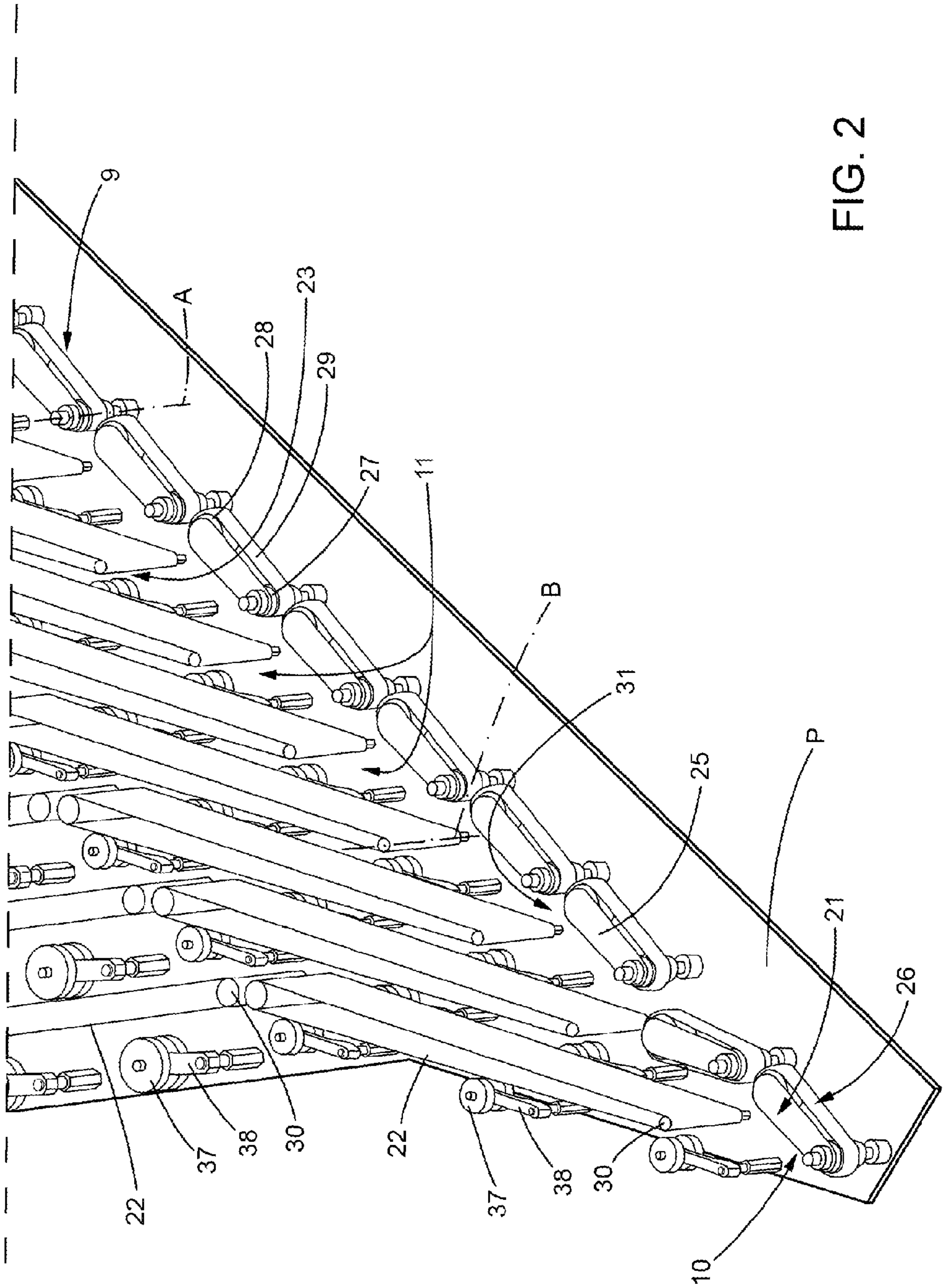
FIG. 2 is a perspective view of a portion of the machine of FIG. 1.

In particular, the module for stacking by shingling 206 has a structure identical to the one illustrated in FIGS. 1 to 3 and described previously and will not be described further in what follows.

The machine 200 further comprises a loading module 207 for loading into purposely provided boxes 208 lots of postal products. As illustrated in FIG. 7, the loading module 207 comprises a conveyor belt 214, which, starting from an initial station 213 adjacent to the sequencers 202, 203, follows an ascending ramp 280, a horizontal section 281 parallel to the direction of advance of the carrier 209, and a descending ramp 282. An overturning station 215 is set in an area of radiusing between the horizontal section 281 and the descending ramp 282. A fixed projection 283 is set at a height with respect to that of the underlying portion of the conveyor belt 214 such that the box 208 is laid on one side and once laid down can pass beyond the fixed projection.

The box 208 receives the postal products ordered according to civic number, i.e., sequenced, in a loading station 216, in which it is inclined both longitudinally and with respect to the vertical as illustrated in FIG. 4.

The box 208 is finally set upright via a fixed surface 284 having an angle of inclination with respect to the vertical smaller than that of the surface that supports the box 8 in the loading station 16. The fixed surface 284 is delimited at the top and at the bottom by respective longitudinal guides 285, 286. In order to bring the box 208 back into the upright position, the longitudinal guide 286 is shorter than the guide 285 so as to define a chute, underneath which a carrier 287 receives the boxes 208 in the position suited for their collection by the postman.

The machine 200 further comprises a processing unit for letters 260 set on a second level on top of the first level. The processing unit for letters comprises a sequencing module 203 for letters, a data-acquisition module 265 for detecting automatically the address on the letters, and a module for stacking by shingling 266 for ordering and preferably sequencing the letters.

Figure 8:
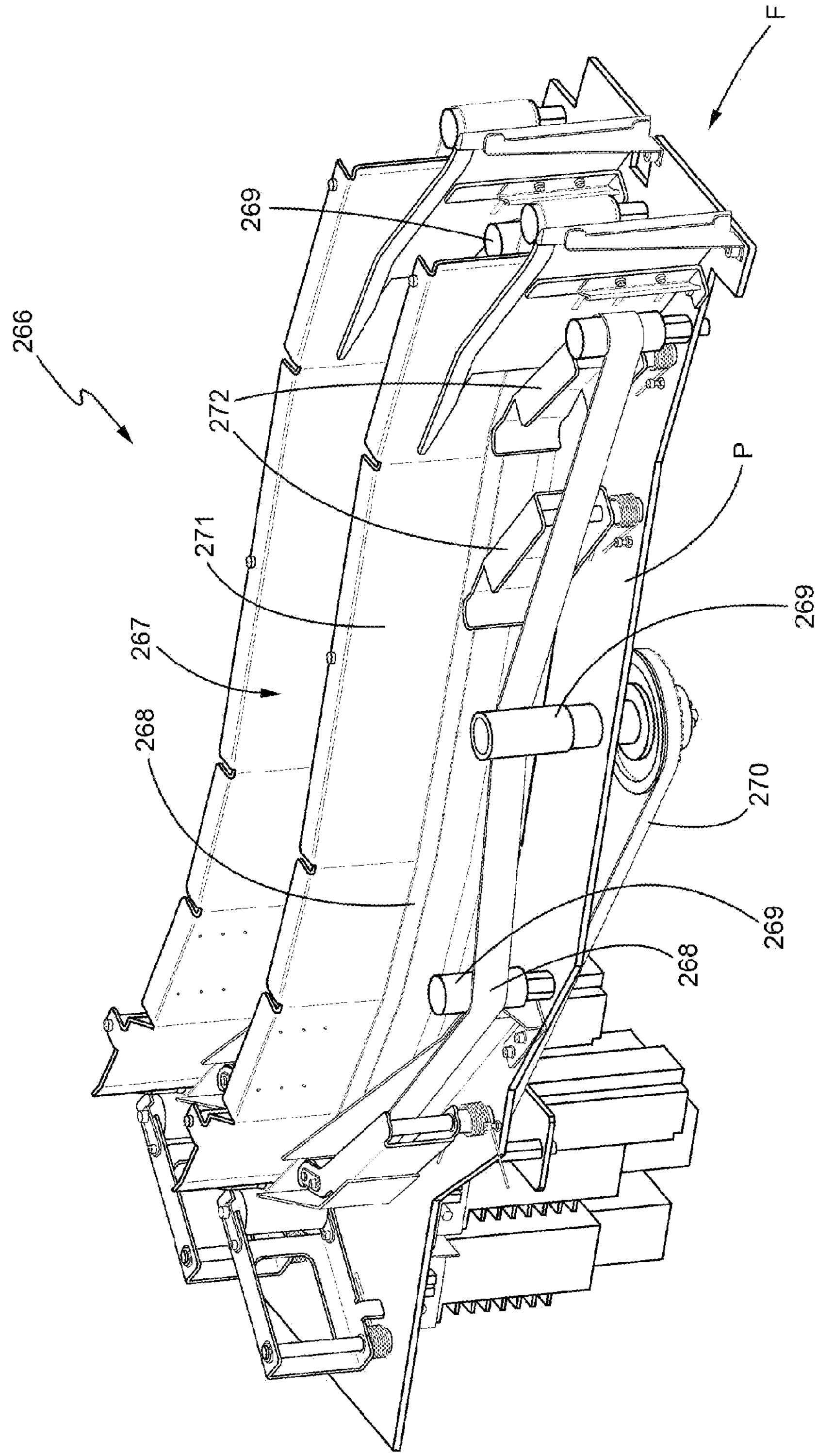
FIG. 8 is a perspective view of a portion of the machine of FIG. 7.

FIG. 8 illustrates a detail of the module for stacking by shingling 266, which comprises a plurality of stacking stations, in which a respective channel 267 is defined laterally by a pair of belts 268 and at the bottom by a fixed support plane P. Each belt 268 is wound around a plurality of rollers 269 that are able to turn about respective fixed axes E coming out in a perpendicular direction from the plane P. At least one roller 269 is driven by an electric motor via a cogged belt 270, and the path of the branches defined between two adjacent rollers 269 is curvilinear and defined by guide walls 271. The non-guided branches of the belt 268 can moreover be tensioned via runners 272. The letters enter into a channel 267 in the direction indicated by the arrow F from a rectilinear carrier 273 (illustrated schematically in FIGS. 9 to 12), which is transverse to the channels 267 and comprises a continuous belt 274 wound between two rollers set at a distance apart for facing all the channels 267 of the module 266. Furthermore, the letters are deviated towards the desired channel 267 via fin deviators (not illustrated) identical to the devices 120. Located at output from each channel 267 is a grouping device 275 (illustrated schematically in FIG. 9).

The grouping device 275 comprises a platform 276, which is mobile between the first level and the second level and actuation means (not illustrated) for handling the platform 276 linearly.

According to the present embodiment, the channels 223 and 267 are set on top of, and correspond to, one another so as to refer to one and the same civic number along the route of the postman. Consequently, at the end of the sequencing stage, flats and letters directed to one and the same address are set on top of one another.

The grouping device 275 is set between the outlet of the module for stacking by shingling 206, 266 and the carrier 212 so as to regulate access of the postal products to the latter only after the flats and letters directed to one and the same destination along the route of the postman have been grouped together or merged.

In particular, the modules for stacking by shingling 206, 266 order respectively a lot made up of flats and a lot made up of letters for a predefined route of the postman according to the respective first and second processing speeds.

At the end of the sequencing operation, the flats of the processed lot are stationary and set in the proximity of the outlet of the corresponding channel 223 and likewise the letters of the processed lot are stationary and set in the proximity of the outlet of the corresponding channel 267.

Figure 9:
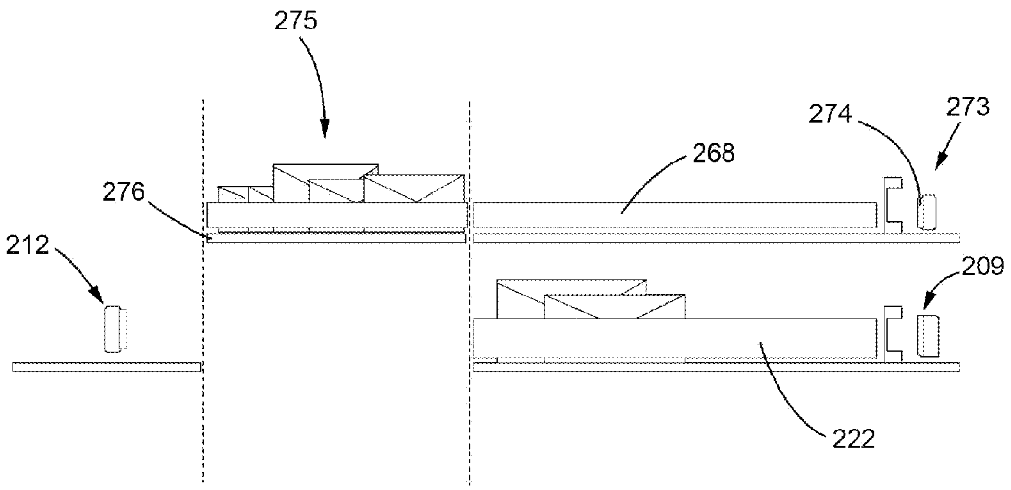
FIGS. 9 to 13 illustrate some steps of operation of the machine of FIG. 7.
Figure 10:
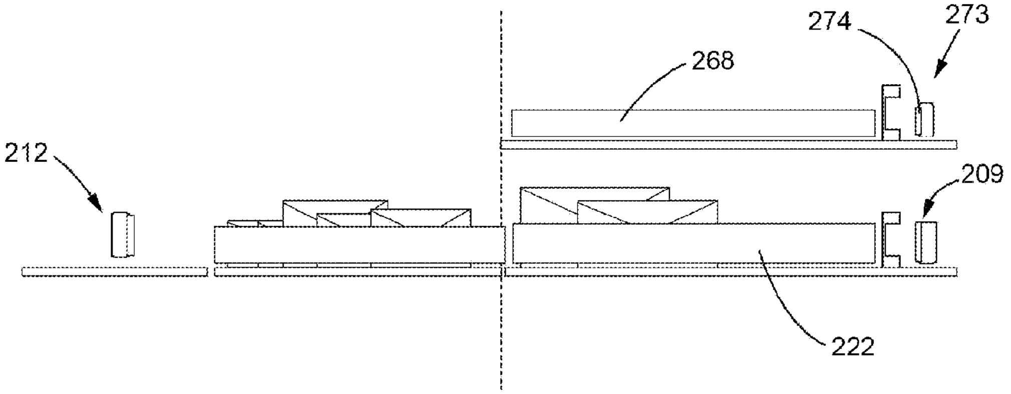

Next, the letters are loaded onto the platform 276, which is then brought up to the level of the channel 223 (FIGS. 9 and 10).

Figure 11:
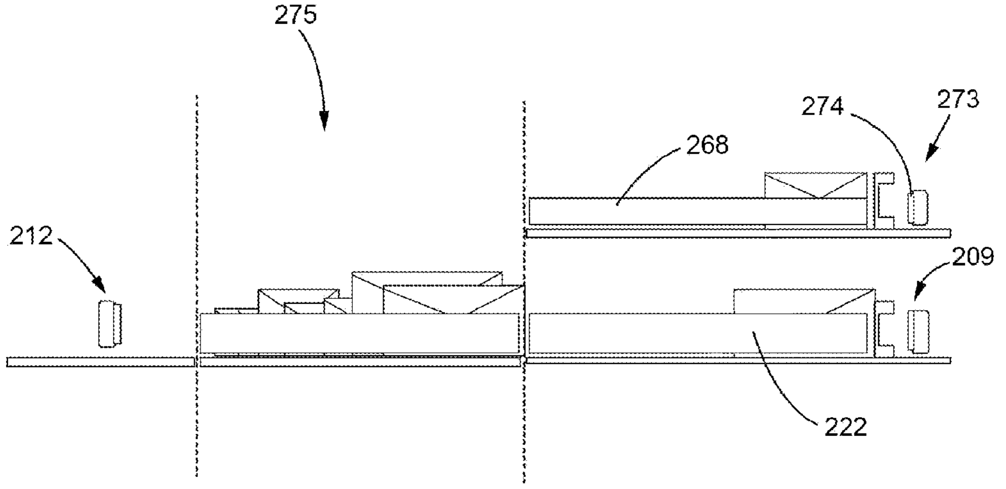
Figure 12:
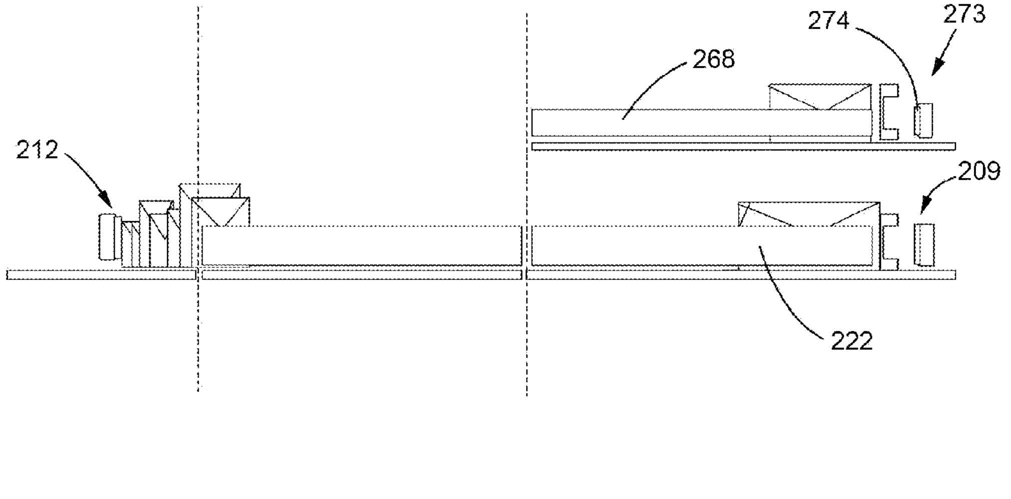
Figure 13:
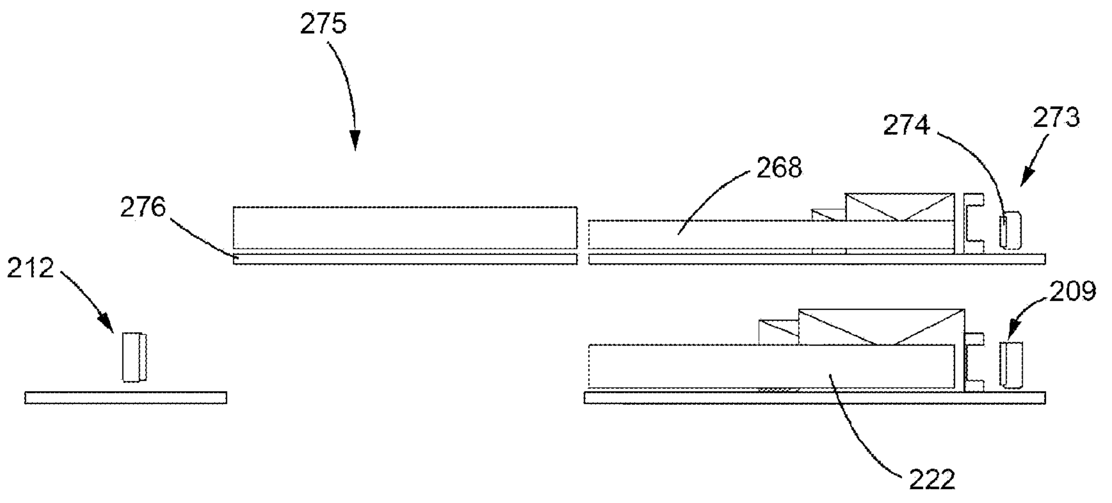

At this point, a sequencing cycle is again started with a new lot made up of flats and letters. Consequently, the belts 222, 268 are handled to enable in an initial step, on the one hand, entry into the channels 223, 267 of flats and letters of a new lot and, on the other, sending also the flats onto the platform 276 together with the letters (FIGS. 11 to 13).

During the operation of sequencing of the subsequent lot of flats/letters, the postal products present on the platform, by now grouped together, are sent along the carrier 212 and simultaneously the flats/letters advance along the respective channel 223, 267.

While the postal products of the new lot advance in the respective channels 223, 267, the postal products already sequenced advance in the carrier 212 and are loaded shingled into the boxes 208, as illustrated in FIG. 4.

The advantages of the sorting machine 1, 100, 200 according to the present invention are described in what follows.

The rollers 30 are supported elastically on the plane P so as to be able to recede in a direction transverse with respect to that of advance of the flats. The flats are in fact more rigid than the letters, and the movement of the rollers 30 is important for deviating the flats.

The substantially horizontal support plane P and the belt carriers 9, 12 co-operating with the faces in such a way that the flats slide in an upright position and are processed in a shingled manner enable an increase in the speed of processing of the flats without excessive costs and taking into account the greater inertia that said postal products have as compared to the letters. In addition, the carriers 9, 12 are of one and the same type and keep the flats always in an upright position.

A further advantage may be appreciated considering that the traffic of flats is for the most part generated by big senders, such as the publishing firms, which are able to sort the flats according to the routes of postmen. The traffic of letters is generated both by senders who send postal items in bulk, like the traffic of postcards between private individuals, and by a big sender, like the traffic deriving from the delivery of bills by a company that supplies energy services. Using the machines according to the present invention, the flats can be received directly by the big sender and ordered and/or sequenced without interfering with the process of sorting of the letters and simplifying the automatic system of sorting of the postal items considerably.

The devices 21 comprise the belt 29, which defines a damping element for dissipating at least in part the kinetic energy of the flats and enabling a fast processing speed.

The devices 21 are moreover connected to a power take-off so as to define in an integrated way also the carrier 9 and reduce the number of components necessary to produce a machine for sequencing flats.

The channels 23 are delimited by the free belts 22 so that the flats, which are more rigid than the letters, have more degrees of freedom in movement. For the same reason, the channels 23 of the stacking stations 11 are inclined with respect to the direction of advance of the flats along the carrier 9 by an angle comprised between 30° and 70°. In each channel 23 the pressure rollers 37 are set upstream with respect to the corresponding belt 22 to offer to the flats a larger space within the curve defined by the flats that are proceeding from the carrier 9 to the desired stacking station 11. At least the roller 30 proximal to the outlet channel 39 is mounted on an elastic support. Said roller 30 is in fact located within the curve defined by the flats that are proceeding between the channels 23 and the outlet channel 39, and thus the handling of the more rigid flats is favoured.

The modality of shingling is employed jointly both for the flats and for the letters in the machine 100, which has the deviating device 120 suited to processing the letters in series to the flats. In this way, it is possible to envisage, for each type of postal product, a single sequencer 102, 103, with advantages linked to the simplification of the machine and to the consequent reduction of the production and maintenance costs. More in general, using the machines 100 and 200 it is possible to process flats and letters simultaneously so as to form at output a single sequenced shingled group of items, which is simpler to deliver.

In addition, the machine 100 is provided with the control for adjusting the speed for processing lots of postal products in such a way that each lot of postal products may be processed alternately at the fastest possible speed.

The machine 200 comprises the module for stacking by shingling 266 added to the module for stacking by shingling 206 so as to be able to process flats and letters in parallel and further reduce the times for processing the lots of postal products. In fact, the speed of processing of the letters is faster than for the flats, and at the end of the operation of sequencing of the flats, the letters are already sequenced and ready for being grouped.

Furthermore, the loading device 7, common to all the machines, thanks to the double inclination of the box 8, enables a facilitated access of the shingled group of items of postal products coming from the outlet channel 39, which is single in all the machines. In this way, the flat postal products and letters are consigned to the postman ordered and grouped together in a single box 8, which can be carried conveniently also when the postman uses a two-wheeled means of transport.

Finally, it is clear that variations may be made to the machines 1, 100, 200 described and illustrated herein, without thereby departing from the sphere of protection, as defined by the annexed claims.

In particular, the module for stacking letters by shingling 266 may be built in a way structurally identical to the module 6 for flats.

Figure 14C:
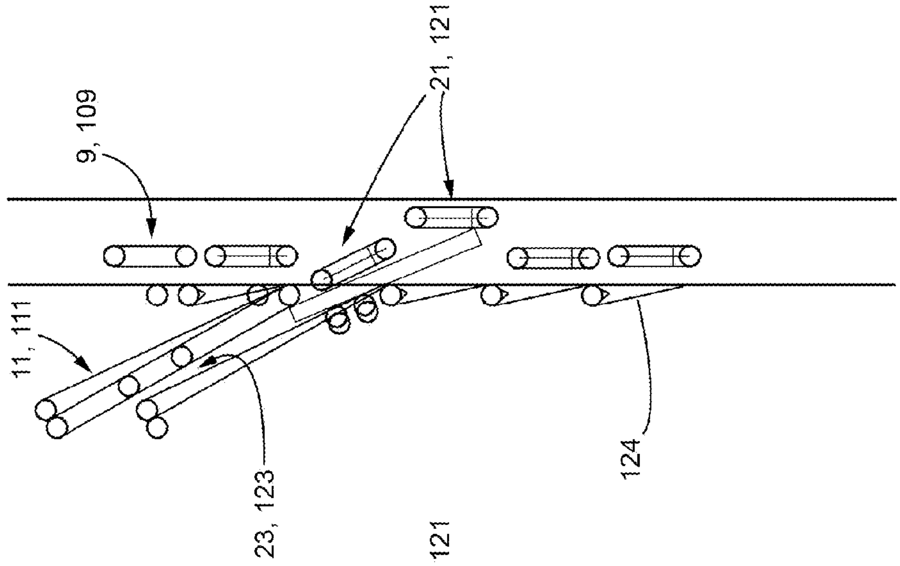
FIG. 14 illustrates the sequence of configurations that some mobile parts of the machine of FIG. 1 assume when a flat is deviated during the sequencing process.
Figure 14B:
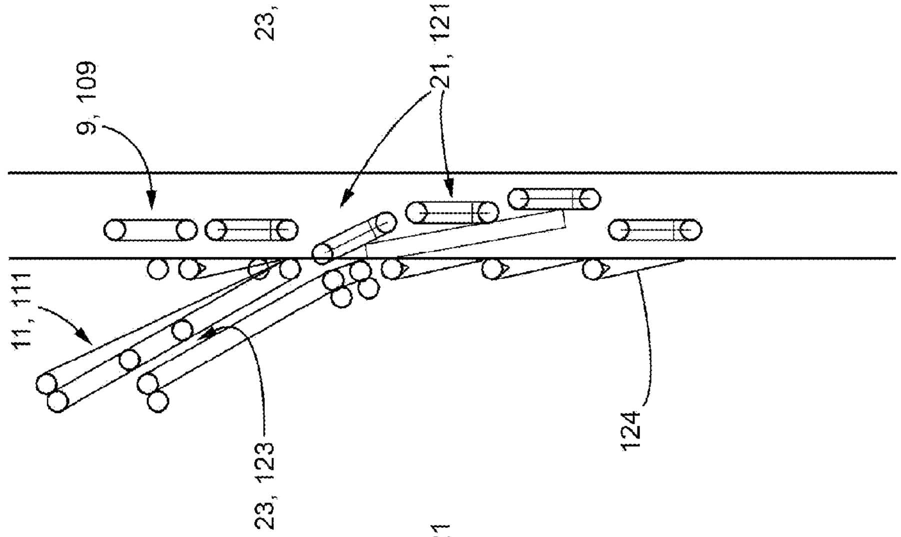
Figure 14A:
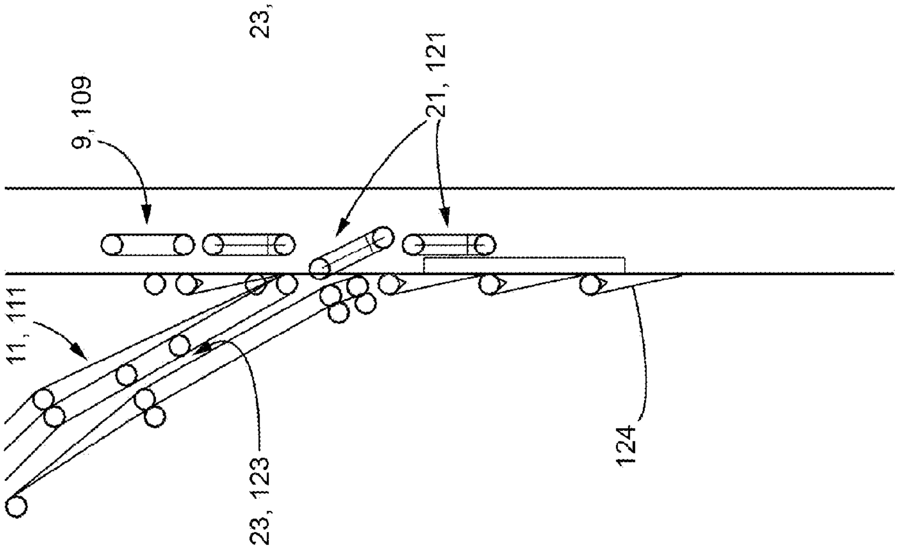

According to a variant, it is possible that also the rollers 30 proximal to the carrier 9 and/or axes A, D are mounted on respective compliant elastic supports for receding when the flats are deviated by the carrier 9 itself towards the channels 23 (as illustrated schematically in FIG. 14).

In addition, the machine 100 can present a single sequencer connected to the control unit and configured for modifying its own operating parameters, for example, the carrying speed, according to the type of postal items processed, i.e., flats or letters.

Furthermore, it is possible to envisage a system of machines in series comprising a machine upstream similar to the machines 1, 100, 200 but without the loading-module system 7 in such a way that the outlet of the carrier 12 of the machine set upstream is the inlet of the sequencers for a machine set downstream. In the latter case, the sorting machine set upstream may not perform the sequencing stage but may process the postal products in another way.

The invention claimed is:

1. A sorting machine for processing at least flat postal items comprising a stacking module (6) having a plurality of stacking stations (11) defining respective channels (23) along which the postal products are carried and a first plurality of rollers (30) for handling the postal products along said stacking stations (11), a first carrying assembly (9) defining a second channel (31) configured so as to carry the postal products towards said stacking module (6) and comprising a second plurality of rollers (27, 28) for carrying said postal products, a plurality of deviating assemblies (10) each of which comprises a first device (21) that may selectively be moved to deviate a flat in said channel (23) of the desired stacking station (11), a second carrying assembly (12) delimiting an outlet channel (39) communicating with said plurality of stacking stations (11), in which at least one of said first and second rollers (27, 28, 30) may transversally be moved with respect to the direction along which the postal products are carried on the machine (1), and further comprising a support plane (P) on which the flats rest by gravity, and in that said first and second carrying assembly (9, 12) and said stacking module (6) are configured so as to come into contact with a face of the flats and carry the latter in an upright position on said support plane (P) before depositing the flats into the stacking stations.

2. The machine according to claim 1, characterised in that it comprises elastic means connected to said at least one roller (27, 28, 30) for holding said roller in a predetermined position.

3. The machine according to claim 1, characterised in that it comprises pivoting pressure rollers (37) mounted in each of said channels (23) so as to come into contact with one face of the postal products.

4. The machine according to claim 3, characterised in that said stacking module (6) comprises at least one belt (22) wound around said first rollers (30) and in that, having two adjacent channels (23) been assigned, said pressure rollers (37) of a channel (23) are configured so as to come into contact with a return branch of a belt (22) delimiting the adjacent channel (23).

5. The machine according to claim 4, characterised in that for each stacking station (11) said belt (22) is downstream with respect to said plurality of pressure rollers (37) with respect to the direction along which the postal products are carried.

6. The machine according to claim 1, characterised in that said deviating assemblies (10) comprise at least one damping device (29) for at least partially dissipating the kinetic energy of the flat during the passage from said carrying assembly (9) to the desired stacking station (11).

7. The machine according to claim 6, characterised in that said damping device comprises a second belt (29).

8. The machine according to claim 7, characterised in that said second belt (29) is motorised.

9. The machine according to claim 8, characterised in that the deviating device (21) comprises an oscillating arm (25) supporting said second rollers (27, 28) carried by said arm (25) and around which said second belt (29) is wound.

10. The machine according to claim 1, characterised in that said deviating device (21) is on the opposite side part of said stacking module (6) and defines said second channel (31).

11. The machine according to claim 1, characterised in that said channels (23) define an angle in the range between 30° and 70° with a forward motion direction of the postal products along said second channel (31).

12. The machine according to claim 11, characterised in that each of said second belts (22) defines at least one free conveying branch adapted to come into contact with a face of the flats.

13. The machine according to claim 1, characterised in that it comprises a single sequencer that may be configured for processing in series both flats and letters.

14. The machine according to claim 1, characterised in that it comprises a single flat sequencer element (2).

15. The machine according to claim 1, characterised in that it comprises a data acquisition module (5) configured for processing postal items at a first speed and at a second speed that differs from the first speed.

16. The machine according to claim 1, characterised in that each of said deviating assemblies (110) comprises a second device (120) that may selectively be moved to deviate a letter in the desired stacking station (111) and having a smaller mass than that of said first device (121).

17. The machine according to claim 16, characterised in that said second device (120) comprises at least one fin (120).

18. The machine according to claim 16, characterised in that said second device (120) is arranged on the opposite side of said first device (121) with respect to said first channel (131) and in that said stacking module (106) and said first carrying assembly (9) are single.

19. The machine according to claim 17, characterised in that it comprises a control unit for alternatively adjusting the forward motion speed of at least said first carrying assembly (109) at a first speed for flats and at a second speed for letters.

20. The machine according to claim 17, characterised in that it comprises a second stacking module (266) arranged in parallel with respect to said stacking module (6) and a grouping device (270) for functionally connecting the outlet of said second stacking module (266) to that of said first stacking module (6).

21. The machine according to claim 20, characterised in that said first and second stacking modules (206, 266) overlap and in that said grouping device (270) comprises a platform (276) that may move between the respective outlets of said first and said second stacking module (206, 266).

22. The machine according to claim 16, characterised in that it comprises a single sequencer (102, 202) for letters.

23. The machine according to claim 1, characterised in that it comprises a loading module (7, 107, 207) configured so that a box (8, 108, 208) is turned over on one side.

24. The machine according to claim 23, characterised in that said loading module (7, 107, 207) defines a loading station (16, 116, 216) for receiving the postal products from said second carrying assembly (12, 112, 212) configured so that said container (8, 108, 208) moves forward inclined on a side thereof by a first angle and longitudinally inclined by a second angle with respect to the vertical.

25. A system of machines for the processing of postal items comprising an upstream sorting machine (1, 100, 200) according to claim 1 and a downstream machine connected in series to said upstream machine so that the postal products processed by said upstream machine (1, 100, 200) are subsequently processed by said downstream machine.

26. machine (1, 100, 200) according to claim 1, wherein the flats are processed in a shingled manner in said sorting device (6) and along said second carrying assembly (12).

27. The machine according to claim 26, configured to order the postal products in a single shingled flow along said second carrying assembly (12).

28. The machine according to claim 26, configured to process a first plurality of postal products by sorting the postal products and collecting the sorted postal products in a single flow, and processing a second plurality of postal products by sorting a second set of postal products, in which said sorting of second postal produces starts while said collecting the first plurality of postal products is taking place.

29. The machine according to claim 20, configured to sort the letters and to perform the collecting in parallel with sorting the flats, in a single flow of postal products.

* * * * *